(12) United States Patent
Alexander et al.

(10) Patent No.: US 7,548,536 B1
(45) Date of Patent: *Jun. 16, 2009

(54) SYSTEM AND METHOD FOR GENERATING MULTIPLE LINE APPEARANCES IN A COMMUNICATION NETWORK

(75) Inventors: John D. Alexander, Plano, TX (US);
Kenneth P. Pruski, Plano, TX (US);
Michael H. Mcclung, Alexandria, VA (US)

(73) Assignee: Cisco Technology, Inc., San Jose, CA (US)

( * ) Notice: Subject to any disclaimer, the term of this patent is extended or adjusted under 35 U.S.C. 154(b) by 779 days.

This patent is subject to a terminal disclaimer.

(21) Appl. No.: 10/925,735

(22) Filed: Aug. 25, 2004

Related U.S. Application Data

(63) Continuation of application No. 09/442,161, filed on Nov. 16, 1999, now Pat. No. 6,798,767.

(51) Int. Cl.
*H04L 12/66* (2006.01)
(52) U.S. Cl. .............. 370/352; 370/401; 379/93.01; 379/211.02; 379/221.01; 455/445
(58) Field of Classification Search ............ None
See application file for complete search history.

(56) References Cited

U.S. PATENT DOCUMENTS

| | | | |
|---|---|---|---|
| 4,876,707 A | 10/1989 | Hashimoto | |
| 5,742,905 A | 4/1998 | Pepe et al. | |
| 5,809,128 A | 9/1998 | McMullin | |
| 5,862,207 A | 1/1999 | Aoshima | |
| 5,960,064 A * | 9/1999 | Foladare et al. | 379/88.26 |
| 5,963,864 A | 10/1999 | O'Neil et al. | |
| 6,041,114 A * | 3/2000 | Chestnut | 379/211.02 |
| 6,282,275 B1 | 8/2001 | Gurbani et al. | |
| 6,304,565 B1 | 10/2001 | Ramamurthy | |
| 6,327,267 B1 | 12/2001 | Valentine et al. | |
| 6,327,358 B1 | 12/2001 | March et al. | |
| 6,353,611 B1 * | 3/2002 | Norris et al. | 370/356 |
| 6,359,892 B1 | 3/2002 | Szlam | |
| 6,421,339 B1 | 7/2002 | Thomas | |
| 6,421,437 B1 | 7/2002 | Slutsman | |
| 6,445,682 B1 | 9/2002 | Weitz | |
| 6,445,694 B1 | 9/2002 | Swartz | |
| 6,449,269 B1 | 9/2002 | Edholm | |
| 6,453,034 B1 | 9/2002 | Donovan et al. | |
| 6,480,474 B2 * | 11/2002 | Johnson et al. | 370/260 |

(Continued)

OTHER PUBLICATIONS

Cisco Systems, Inc.; "System Description for the Cisco Communications Network Version 2.1;" Cisco Communications Network; all, 1997.

*Primary Examiner*—Bob A Phunkulh
(74) *Attorney, Agent, or Firm*—Baker Botts L.L.P.

(57) ABSTRACT

A communication system includes a communication network, and an originating telephony device, a target telephony device, and a call manager coupled to the communication network. The call manager signals the target telephony device to indicate an incoming call from the originating telephony device. The call manager includes an alternate number list that identifies at least one alternate telephony device to be signaled in response to the incoming call directed to the target telephony device. The call manager additionally includes one or more mapping tables associating a packet network address with each identified alternate telephony device.

31 Claims, 5 Drawing Sheets

U.S. PATENT DOCUMENTS

| | | |
|---|---|---|
| 6,480,484 B2 | 11/2002 | Morton |
| 6,515,997 B1 | 2/2003 | Feltner et al. |
| 6,519,252 B2 | 2/2003 | Salberg |
| 6,526,033 B1 | 2/2003 | Wang et al. |
| 6,532,286 B1 | 3/2003 | Burg |
| 2002/0126679 A1* | 9/2002 | Morton ................ 370/401 |

* cited by examiner

FIG. 4A
120a

| PHONE NUMBER | DEVICE/GROUP NAME |
|---|---|
| 1001 | PHONE1 |
| 1002 | PHONE2 |
| 1002 | PHONE3 |
| 2000-2999 | PBXGATEWAY |
| 214-555-5001 | GATEWAYGROUP1 |
| 214-555-5002 | GATEWAYGROUP1 |
| 214-555-5003 | GATEWAYGROUP1 |
| 972-555-6000 | GATEWAY5 |
| 3015 | PHONE25 |
| 703-XXX-XXXX | GATEWAYGROUP2 |

122 { (left) } 123 (right)

FIG. 4B
120b

| DEVICE NAME | IP ADDRESS |
|---|---|
| PHONE1 | 150.100.30.1 |
| PHONE2 | 150.100.30.2 |
| PBXGATEWAY | 150.100.30.50 |
| GATEWAY1 | 150.100.30.55 |
| GATEWAY2 | 150.100.30.56 |
| GATEWAY3 | 150.100.30.57 |
| GATEWAY5 | 150.100.30.58 |
| PHONE25 | 150.200.70.15 |
| GATEWAY10 | 150.200.70.50 |
| GATEWAY11 | 150.200.70.51 |

123 { (left) } 124 (right)

SYSTEM AND METHOD FOR GENERATING MULTIPLE LINE APPEARANCES IN A COMMUNICATION NETWORK

CROSS-REFERENCE TO RELATED APPLICATION

This application is a continuation of U.S. application Ser. No. 09/442,161 filed Nov. 16, 1999, now U.S. Pat. No. 6,798,767, and entitled "System and Method for Generating Multiple Line Appearances in a Communication Network".

TECHNICAL FIELD OF THE INVENTION

This invention relates generally to the field of telecommunications, and more specifically to a system and method for generating multiple line appearances in a communication network.

BACKGROUND OF THE INVENTION

Historically, telecommunications have involved the transmission of voice and fax signals over a network dedicated to telecommunications, such as the Public Switched Telephone Network (PSTN) or a Private Branch Exchange (PBX). Similarly, data communications between computers have also historically been transmitted on a dedicated data network, such as a local area network (LAN) or a wide area network (WAN). Currently, telecommunications and data transmissions are being merged into an integrated communication network using technologies such as Voice over Internet Protocol (VoIP). Since many LANs and WANs transmit computer data using Internet Protocol (IP), VoIP uses existing LAN technology to transport voice and fax signals by converting these signals into digital data and encapsulating the data for transmission over an IP network. Because of the integration of IP telephony devices and data networks, many features are now available to users of VoIP (and other voice/data integration technologies) that have not been available to users of traditional telecommunication networks.

SUMMARY OF THE INVENTION

In accordance with the present invention, a system and method for generating multiple line appearances in a communication network is provided that substantially eliminates or reduces disadvantages or problems associated with previously developed systems and methods. In particular, the present invention contemplates a system and method for generating line appearances at one or more alternate telephony devices associated with a target telephony device in response to a call made to the target telephony device.

In one embodiment of the present invention, a communication system is provided that includes a communication network, and an originating telephony device, a target telephony device, and a call manager coupled to the communication network. The call manager signals the target telephony device to indicate an incoming call from the originating telephony device. The call manager includes an alternate number list that identifies at least one alternate telephony device to be signaled in response to the incoming call directed to the target telephony device. The call manager additionally includes one or more mapping tables associating a packet network address with each identified alternate telephony device.

In another embodiment of the present invention, a method of generating multiple line appearances in a communication network is provided. The method includes receiving a call initiation request from an originating telephony device that is coupled to the communication network. The call initiation request is directed to a target telephony device that is also coupled to the communication network. The method also includes determining a telephone number of at least one alternate telephony device from an alternate number list associated with the target telephony device, and determining a packet network address associated with the alternate telephony device. The method further includes signaling the target telephony device to indicate the call initiation request from the originating telephony device, and signaling the alternate telephony device using the determined packet network address to indicate the call initiation request from the originating telephony device.

Technical advantages of the present invention include a system and method that allow multiple telephony devices to be rung in response to a call being made to a single telephony device. For example, a user may associate one or more alternate devices with a target telephony device such that the alternate devices are rung when a call is placed to the target telephony device. Alternate devices that may be rung include IP telephony devices and non-IP telephony devices, such as PSTN and PBX devices. The alternate devices may be rung simultaneously with the target device, or one or more of the alternate devices may be rung at a specified time after the target telephony device is rung. A further advantage of the present invention includes the ability to remotely create and edit a list of alternate telephony devices associated with a telephony device.

Other technical advantages are readily apparent to one skilled in the art from the following figures, descriptions, and claims.

BRIEF DESCRIPTION OF THE DRAWINGS

For a more complete understanding of the present invention, and for further features and advantages, reference is now made to the following description, taken in conjunction with the accompanying drawings, in which:

FIG. 4A illustrates an exemplary mapping table in accordance with the present invention;

FIG. 4B illustrates another exemplary mapping table in accordance with the present invention;

DETAILED DESCRIPTION OF THE INVENTION

Figure 1:
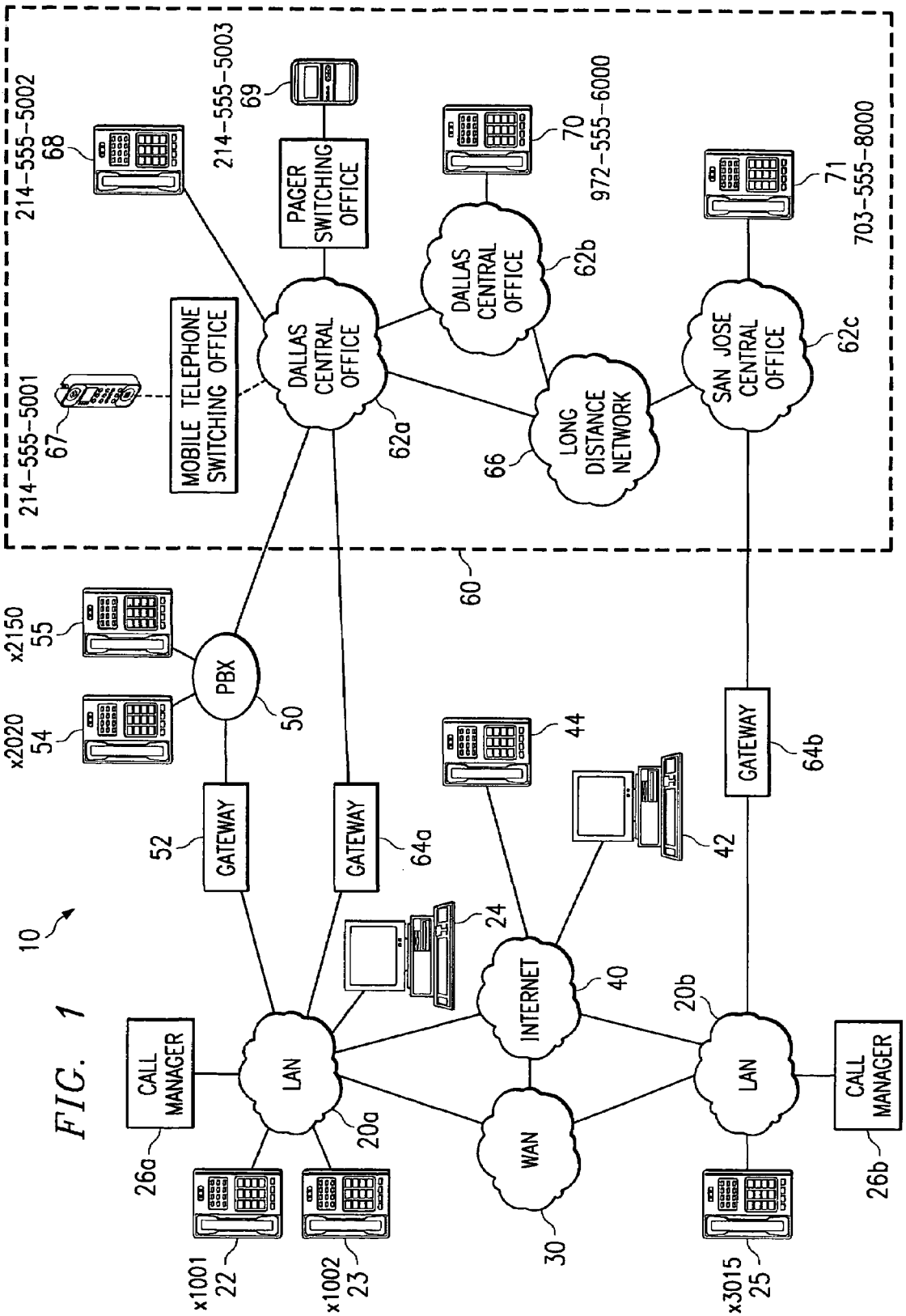
FIG. 1 illustrates an exemplary communication network in accordance with the present invention.

FIG. 1 illustrates an exemplary communication network 10. Although a specific communication network is illustrated in FIG. 1, the term "communication network" should be interpreted as generically defining any network capable of transmitting telecommunication signals, data, and/or messages. In the illustrated embodiment, communication network 10 includes a plurality of local area networks (LANs) 20 interconnected using a wide area network (WAN) 30. Each LAN 20 is a computer data network that is further operable to transmit audio and/or video telecommunication signals. In the particular embodiment illustrated in FIG. 1, LANs 20 are Internet Protocol (IP) networks. However, LANs 20 may be any type of network that allows the transmission of audio and video telecommunications, as well as traditional data communications. Therefore, although subsequent description will primarily focus on IP telephony devices, it should be understood that other appropriate telephony devices, such as Voice over Frame Relay devices, are also included within the scope of this description.

LANs 20 may be directly coupled to other IP networks including, but not limited to, WAN 30 and any IP networks coupled to WAN 30 (such as other LANs 20 or the Internet 40). Since all IP networks share a common method of transmitting data, telecommunication signals may be transmitted between telephony devices located on different, but interconnected, IP networks. In addition to being coupled to other IP networks, LANs 20 may also be coupled to non-IP telecommunication networks through the use of gateways. For example, LAN 20a is coupled to a private branch exchange (PBX) 50 through a gateway 52. PBX 50 represents analog and/or digital telephone systems used by businesses. PBX 50 includes a plurality of extension telephony devices or subscriber sets 54, 55 to which PBX 50 directs incoming telephone calls. Gateway 52 may be either an analog or digital gateway depending on the type of PBX 50 to which it is coupled. The operation of the gateways in communication network 10 is described in greater detail below.

Another non-IP network to which LANs 20 may be coupled is the Public Switched Telephone Network (PSTN) 60. PSTN 60 includes switching stations, central offices, mobile telephone switching offices, pager switching offices, remote terminals, and other related telecommunications equipment that are located across the country. For example, central offices (COs) 62 connect telephone customers, such as residences and businesses, to PSTN 60. In the illustrated embodiment, LANs 20 are coupled to selected central offices 62 through the use of gateways 64, described below. Central offices 62 in a particular area, such as COs 62a and 62b in Dallas, may be directly connected to allow local communication between residences and businesses in that area.

Central offices 62 are also coupled through a long distance network 66 that allows communication between residences and business coupled to central offices in different areas, such as CO 62a in Dallas and CO 62c in San Jose. The entity that owns the communication lines comprising long distance network 66 (there are typically several different entities, each having their own communication lines) charges a fee for the use of these lines. However, one advantage of IP telephony is that a company owning (or leasing) LANs 20 and WAN 30 may avoid such fees for calls between LAN 20a and LAN 20b by using WAN 30 to transmit calls between the LANs. Internet 40 may also be used to transmit calls, but the quality of such calls is typically low.

IP networks transmit data (including voice and video data) by placing the data in packets and sending each packet individually to the selected destination. This is known as a packet-switched network. Unlike a circuit-switched network (like PSTN 60), dedicated bandwidth is not required for the duration of a call or fax transmission over LANs 20, WAN 30 or Internet 40. Instead, each telephony device sends packets across the network as they become available for transmission. This feature makes bandwidth available for other data when voice or fax data is not being transmitted.

The technology that allows telecommunications to be transmitted over an IP network is typically referred to as Voice over IP (VoIP). IP telephony devices 22-24 are coupled to LAN 20a to allow such communication over LAN 20a. IP telephony devices 22-24 have the capability of encapsulating a user's voice (or other inputs) into IP packets so that the voice can be transmitted over LAN 20a, WAN 30 and/or Internet 40. IP telephony devices may include telephones, fax machines, computers running telephony software (such as MICROSOFT NETMEETING), or any other device capable of performing telephony functions over an IP network.

One example of an IP telephony device is an IP Ethernet telephony device that plugs directly into an Ethernet RJ45 jack, as opposed to a traditional RJ11 telephone jack. Alternatively, a user may plug a handset or headset directly into a personal computer 24 on LAN 20 to form a virtual IP telephony device. An IP telephony device typically resembles a traditional digital PBX telephony device, but instead of connecting to a proprietary PBX port, the telephony device plugs into a LAN jack, such as an Ethernet jack. An IP telephony device operates as a standard IP network device and typically has its own IP address (although it may be assigned dynamically). IP telephony devices may also have the ability to handle data coding and decoding at the telephony device. This feature allows the telephony device to switch compression schemes on demand, such as switching between G.711 and G.723 compression.

A call manager 26a controls IP telephony devices 22-24 (a similar call manager 26b may be located on LAN 20b). Call manager 26a is an application that controls call processing, routing, telephone features and options (such as call hold, call transfer and caller ID), device configuration, and other telephony functions and parameters within communication network 10. Call manager 26a can control all of the IP telephony devices on LAN 20a, and it may also control IP telephony devices located across WAN 30. For example, call manager 26a is capable of controlling telephony devices on LAN 20b. Thus, call manager 26b may be eliminated entirely or used as a redundant controller.

When a user wishes to place a call from one IP telephony device on LAN 20a to another IP telephony device on LAN 20a (an intra-LAN call), the calling telephony device transmits a signal to call manager 26a indicating the desired function and the telephony device to be called. Call manager 26 then checks on the availability of the called telephony device and, if available, sets up the call by instructing the calling party (the originating telephony device) to set up an audio stream with the called (target) telephony device. The initial signaling between call manager 26a and either the originating telephony device or the target telephony device is transmitted over LAN 20a (and, if necessary, WAN 30) using Transmission Control Protocol (TCP) or any other suitable protocol. A TCP layer in the transmitting telephony device divides the data to be transmitted into one or more packets, numbers the packets, and then forwards them individually to the IP network layer for transmission to the destination telephony device. Although each packet has the same destination IP address, the packets may travel along different paths to reach the intended destination. As the packets reach the destination telephony device, the TCP layer reassembles the individual packets and ensures that they all have arrived. Once TCP reassembles the data, it forwards the data to the destination telephony device as a single message.

After call manager 26a has initiated the call, a codec (coder/decoder) converts the voice, video or fax signals generated by the users of the telephony devices from analog voice signals into digital form. The codec may be implemented either in software or as special-purpose hardware in IP telephony devices 22-24. In the case of an IP telephony device, as the user speaks into the handset, the codec converts the analog voice signals into digital data. The digitally encoded data is then encapsulated into IP packets so that it can be transmitted over LAN 20*a*.

The encapsulation is typically performed by Real-Time Transport Protocol (RTP) running over UDP (User Datagram Protocol), although other appropriate protocols may be used. As with TCP, UDP uses the Internet Protocol to get data packets from one computer to another. Unlike TCP, however, UDP does not provide sequencing and error-checking of the arriving packets. However, since UDP does not perform these functions, UDP operates faster than TCP and is useful when low delay times are more important than accuracy. This is true of audio and video streaming since it is critical that the data be transmitted as quickly as possible, but it is not critical that every single packet is reassembled correctly (either its absence is negligible or it contents can be extrapolated by the destination telephony device). Once UDP has received and reassembled the IP packets at the destination telephony device, a codec in the destination telephony device translates the digital data into analog voice signals for presentation to the user. The entire process is repeated each time any call participant (or any other source) generates an audio, video, or fax signal.

In addition to intra-LAN telephone calls, calls can also be placed to and received from non-IP telephony devices 54, 55, 67, 68, 69, 70, 71 that are connected to PSTN 60 or PBX 50. Such calls are made through a gateway 52, 64. Because gateway 52 performs similarly to gateway 64, only gateway 64 will be discussed in further detail. Gateway 64 converts analog or digital circuit-switched data transmitted by PSTN 60 to packetized data transmitted by LAN 20, and vice-versa. When voice data packets are transmitted from LAN 20, gateway 64 retrieves the data contained in the incoming packets and converts this digital data to the analog or digital format used by the PSTN trunk to which gateway 64 is coupled. Since the digital format for voice transmissions over an IP network is often different than the format used on the digital trunks of PSTN 60, the gateway provides conversion between these different digital formats, referred to as transcoding. Gateway 64 also translates between the VoIP call control system and the Signaling System 7 (SS7) protocols used in PSTN 60, including, but not limited to, Integrated Services Digital Network (ISDN) protocols.

For voice transmissions from PSTN 60 to LAN 20, the process is reversed. Gateway 64 takes the incoming voice transmission (either in analog or digital form) and converts it into the digital format used by LAN 20. The digital data is then encapsulated into IP packets and transmitted over LAN 20.

When making a call to a PSTN telephony device 67-71 from IP telephony device 22 on LAN 20*a*, the voice or fax signal generated by the user of IP telephony device 22 is digitized and encapsulated, as described above. The packets are then transmitted over LAN 20*a* to gateway 64. If more than one PSTN gateway 64 is coupled to LAN 20, call manager 26 determines which gateway is to receive the transmission based on the telephone number (e.g., the North American Numbering Plan (NANP) number) of the PSTN telephony device. Gateway 64 retrieves the IP packets and converts the data to the format (either digital or analog) used by the PSTN trunk to which the gateway is connected. The voice signals are then sent to the PSTN telephony device 67-71 over PSTN 60. This process, and the reverse process, is continued between PSTN 60 and LAN 20 through gateway 64 until the call is complete.

Calls can also be made between an IP telephony device located on LAN 20 and another IP telephony device located on another LAN 20, across WAN 30, or on Internet 40. For example, a call may be place between IP telephony device 22 connected to LAN 20*a* and IP telephony device 25 connected to LAN 20*b*. As discussed above, the analog voice or fax data is digitized and encapsulated into IP packets at the originating IP telephony device 22. However, unlike communications with telephony devices on PSTN 60, gateway 64 is not needed to convert the IP packets to another format. Instead, a router (or other similar device) directs the packets to the IP address of the target IP telephony device 25. IP telephony device 25 then retrieves the data and coverts it to analog form for presentation to the user. IP telephony device 25 may be controlled by the same call manager 26*a* as IP telephony device 22, or it may be controlled by call manager 26*b* on LAN 20*b*.

When a call is placed to an IP telephony device, for example IP telephony device 22, a call initiation request is first sent to call manager 26*a*. If the originating telephony device is an IP telephony device (e.g., an intra-LAN or inter-LAN IP call), the originating IP telephony device generates the call initiation request and sends the request to call manager 26*a*. If the originating telephony device is a non-IP telephony device, such as PSTN telephony device 68, gateway 64*a* first intercepts the incoming call from CO 62*a*, and sends a call initiation request to call manager 26*a* indicating the IP telephony device that is being called. In either case, once call manager 26*a* receives the call initiation request, call manager 26*a* sends a signal to the target IP telephony device offering the call to the telephony device.

If the target telephony device (IP telephony device 22) can accept the call (e.g., it is not in use or under a Do Not Disturb instruction from the user), IP telephony device 22 replies to call manager 26*a* that it will accept the call. Upon receiving this acceptance, call manager 26*a* transmits a signal to IP telephony device 22 to cause it to ring. The telephony device's user can then hear the ring and can take the telephony device "off-hook" to receive the call. Taking the telephony device off-hook may include, but is not limited to, picking up a handset, pressing the ringing line's button, pressing a speakerphone button, or otherwise indicating that the telephony device is ready to receive the incoming call. For the purposes of this application, the term "off-hook" is used to generically indicate a condition of a telephony device when it is ready to initiate or receive telecommunication signals. Once IP telephony device 22 has been taken off-hook, call manager 26*a* sets up an RTP audio and/or video stream between IP telephony device 22 and the originating telephony device. If the originating telephony device is a non-IP telephony device, such as PSTN telephony device 68, the data streaming occurs between IP telephony device 22 and gateway 64*a*. Gateway 64*a* then transmits the audio and/or video data to PSTN telephony device 68.

Figures 2, 3:
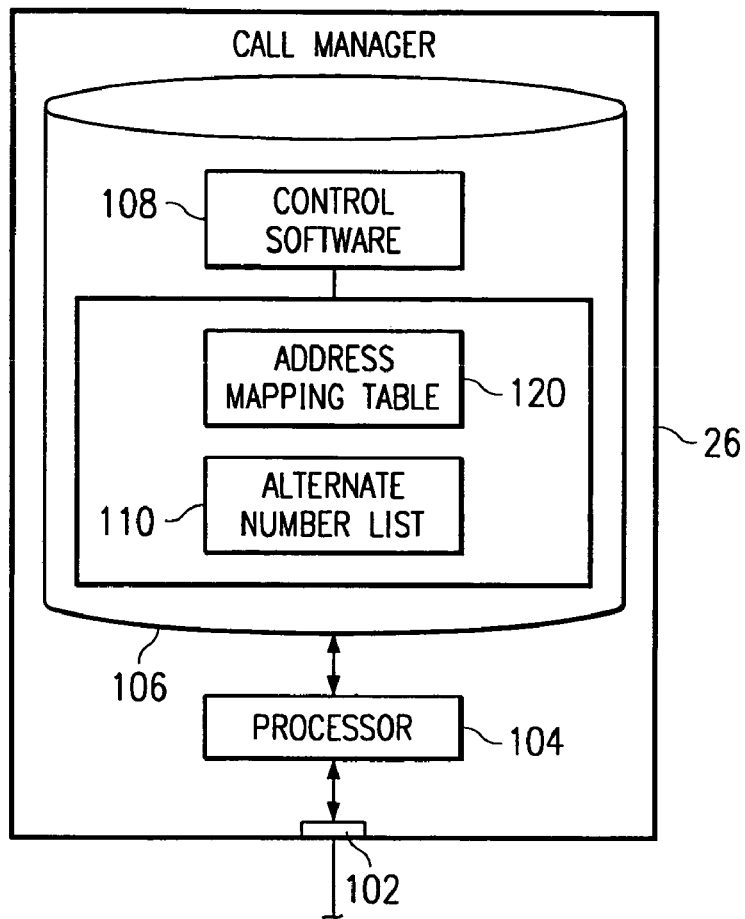
FIG. 2 illustrates an exemplary call manager in accordance with the present invention.
FIG. 3 illustrates an exemplary alternate number list in accordance with the present invention.

FIG. 2 illustrates an exemplary call manager 26. Call manager 26 includes a network interface 102 that receives data from and transmits data to LAN 20 (or any other type of network to which call manager 26 is coupled). Network interface 102 may be any electrical, physical, electromagnetic, or wireless connection enabling call manager 26 to be coupled to a network. One example of network interface 102 is an RJ-45 interface, which is typically used in an Ethernet network. Call manager 26 also includes a processor 104 and a memory 106 that is accessible by processor 104. Memory 106 may include any type of volatile or non-volatile computer memory such RAM (or its variants), Flash, ROM, PROM, EPROM, EEPROM, or any other appropriate means of storing data. Memory 106 may also include media storage devices including, but not limited to, hard drives, diskettes, CD-ROMs, DVD-ROMs, or other optical or magnetic storage devices.

Memory 106 contains telephony control software or firmware 108 that provides the various telephony functions needed to control IP telephony devices. Examples of these functions include, but are not limited to, network interfacing, IP tasks (e.g., a TCP/IP stack), telephony device set-up and configuration, call set-up, and Web-based administration and help services. It should be noted that although the term "call manager" has been used to refer to a complete computer system running telephony control software, the term may also refer only to the control software. A dedicated computer is not needed to run the call manager control software. For example, the software may be loaded on an existing computer, such as a server, on the IP network. Alternatively, the call manager function may be distributed throughout each LAN 20 on the various IP telephony devices. The call manager software may be embodied in any type of computer-readable medium including, but not limited to, hard drives, diskettes, CD-ROMs, DVD-ROMs, or other optical or magnetic storage devices.

Memory 106 also contains at least one alternate number list 110 and one or more address mapping tables 120. Using control software 108, processor 104 is operable to access list(s) 110 and tables 120 in order to set up calls between telephony devices and to create multiple line appearances (e.g., ring multiple telephony devices) when a call is placed to an IP telephony device.

FIG. 3 illustrates an exemplary alternate number list 110. Potentially, every IP telephony device controlled by call manager 26 can have an associated alternate number list. List 110 is an example of an alternate number list associated with IP telephony device 22. Referring now to FIGS. 1 and 3, when call manager 26a receives a call initiation request to set up a call with IP telephony device 22 (extension 1001), call manager 26a may be programmed to first access list 110 to determine whether multiple line appearances should be created in response to the call initiation request. For example, call manager 26a may access list 110 to determine at least one other telephony device to ring in addition to IP telephony device 22 when IP telephony device 22 is called.

Alternate number list 110 includes two sets of data entries. The first set of entries comprises one or more alternate numbers 112 to ring when a call comes in for IP telephony device 22 at extension 1001. Alternate numbers 112 may include, but are not limited to, other IP extensions controlled by call manager 26, PBX extensions, and telephone numbers of telephony devices on PSTN 60. In exemplary list 110, alternate numbers 112 include IP telephony device 23 on LAN 20a (at extension 1002), PBX telephony device 55 (at extension 2150), PSTN cellular telephony device 67 (at 214-555-5001), IP telephony device 25 on LAN 20b (at extension 3015), and PSTN pager 69 (at 214-555-5003). Although extensions and NANP numbers are illustrated in list 110, it should be understood that any other identifier of telephony devices may also be used. For the purposes of this application, the terms "number," "extension" or "telephone number" should be interpreted generically to mean any number, combination of numbers, or other suitable information used to identify a telephony device.

The second set of entries in alternate number list 110 comprises ring delay times or periods 114 (in seconds or any other appropriate unit) that are associated with each alternate number 112. The value of ring delay period 114 informs call manager 26 of the length of time to wait before ringing each alternate number. All numbers that have no delay period (or a zero value) are rung first. Call manager 26 then rings the other numbers based on their respective delay periods. For example, according to alternate number list 110, call manager first will ring IP telephony device 22 and PBX telephony device 55. Call manager 26 will then wait three seconds before ringing cell telephony device 67 and IP telephony device 25. Finally, call manager will wait another four seconds before ringing pager 69.

Non-zero delay periods may be used for several reasons. For example, the user of IP telephony device 22 may only wish to initially ring telephony devices at his main place of business, such as IP telephony device 22 and PBX telephony device 55. The user may even wish to set the delay periods 114 for all alternate numbers 112 to non-zero values so that only target telephony device 22 is initially rung. After the user's main telephony device or telephony devices are initially rung, the user can then have external numbers rung, such as cellular telephony device 67 and IP telephony device 25. Non-zero delay periods are also useful when an alternate number 112 is associated with an automatic answering device such as pager 69 or an answering machine or voice mail system. Using a delay period in conjunction with such devices allows the target and/or other alternate telephony devices to be answered before the automatic answering device(s) answers the call.

Although alternate number list 110 has been described as including two specific sets of entries (telephone numbers and delay periods), list 110 may include other types of data entries. In general, list 110 typically includes information identifying alternate devices and information regarding how these alternate devices are to be signaled in response to a call being placed to the target device. These two types of information may take a form other than the type described above. For example, instead of including a ring delay period having a time value, other embodiments of list 110 may include a selected number of rings to wait before ringing alternate devices (such as the number of times the target telephony device has rung). Furthermore, the alternate number list may also include information regarding how to process a call once the target telephony device or one of the alternate telephony devices have gone off-hook. These processing options are described in further detail in conjunction with FIG. 5B.

Call manager 26 further includes one or more mapping tables or databases 120. Exemplary mapping tables 120a and 120b are illustrated in FIGS. 4A and 4B, respectively. Generically, mapping tables 120 translate the signaling protocol of a first network into the signaling protocol of a second network. More specifically, call manager 26 uses mapping tables 120 to translate a telephone number or extension, such as alternate numbers 112, into a network address. In a particular embodiment, the network address is an IP address, although any other appropriate network address may be used. The translation is necessary since an IP network transmits information to a device based on its IP address, not based on a telephone number (unlike PSTN 60).

Mapping table 120a includes two sets of data entries. The first set of entries comprises various telephone numbers or extensions 122. The second set of entries comprises a device or group name 123 associated with each telephone number. Each telephony device in communication network 10 typically has a device name. A group of telephony devices, for example, a group of gateways, may have a group name. It should be noted that a single number 122 may have multiple device or group names 123 with which it is associated (e.g., calling a particular telephone number 122 may ring a manager's telephony device as well as a telephony device on the desk of the manager's secretary).

Like mapping table 120*a*, mapping table 120*b* also includes two sets of data entries. The first set of entries comprises device names 123 (e.g. device names from table 120*a* and the device names comprising the groups named in table 120*a*). The second set of entries comprises an IP address 124 associated with each device name 123. Therefore, using mapping tables 120*a* and 120*b* in combination, call manager 26 can determine the IP address or addresses to which a call to a specific telephone number should be directed.

It should be understood that although alternative number list 110 and mapping tables 120*a* and 120*b* are described as three separate tables or databases, the information in these tables may be combined or separated into any number of tables stored at one or more locations.

When an IP telephony device is connected to LAN 20, the telephony device gets an IP address using Dynamic Host Control Protocol (DHCP) or another similar protocol or technique. The telephony device then registers with call manager 26 using its Media Access Control (MAC) address and device name. The telephony device also informs call manager 26 of its IP address. Call manager 26 sends a message to the telephony device in response assigning one or more extension numbers to the telephony device. Call manager 26 associates the IP address of the telephony device with the device name of the telephony device in mapping table 120*b*, and associates the device name with the telephony device's assigned extension number(s) in mapping table 120*a*. This association allows call manager to signal the telephony device given its telephone number. It should be noted that although the extension numbers shown in mapping table 120*a* for IP telephony devices 22, 23 and PBX telephony devices 54, 55 are four-digit internal extensions, the extension numbers for these telephony devices may also be full NANP telephone numbers that can be directly dialed from PSTN 60.

Since non-IP telephony devices are also included as alternate numbers 112 in alternate number list, call manager also needs to be able to signal these telephony devices. However, these telephony devices are not in an IP network, and do not have IP addresses. Therefore, all communications to these devices are addressed to the gateway to which the telephony devices are coupled, either directly or through one or more intermediate devices such as PBX 50, CO 62, and long distance network 66. For example, if call manager 26*a* wishes to ring PSTN telephony device 68, call manager 26*a* sends a message to gateway 64*a* using the gateway's IP address. This message contains the telephone number of PSTN telephony device 68. Gateway 64*a* retrieves the IP packets and determines the number to be rung. Gateway 64*a* then dials the telephone number of telephony device 68 (214-555-5002) over the CO trunk in order to ring telephony device 68. The terms "dial" or "ring" should be interpreted generically to indicate any signal sent from gateway 64*a* indicating a request to connect to telephony device 68.

Because communications with non-IP telephony devices are typically transmitted through a gateway, the device name 123 associated with the telephone numbers 122 of non-IP telephony devices in mapping table 120*a* is the device name of the gateway (or the group name of the group of gateways) through which communications are transmitted to and received from the non-IP telephony devices. If a group name is listed, a gateway from the group is selected by call manager 26, and the address 124 associated with that gateway's device name in table 120*b* is used. Table 120*a* may use telephone number ranges and/or wildcard characters in any arrangement or format that defines groups of telephone numbers serviced by a particular gateway(s). For example, in mapping table 120*a*, gateway 52, having a device name of PBXGATE- WAY, is associated with all extensions from 2000 to 2999 (e.g., all extension numbers assigned to PBX 50).

Mapping table 120*a* and/or 120*b* may also include a third type of entry that indicates whether the IP address associated with a particular device name is the address of an IP telephony device or the address of a gateway. For example, table 120*b* may include a gateway flag that informs call manager 26 that any signals sent to a particular address should be in a format used to instruct a gateway to signal an associated non-IP telephony device instead of a format used to communicate directly with an IP telephony device.

Figure 5A:
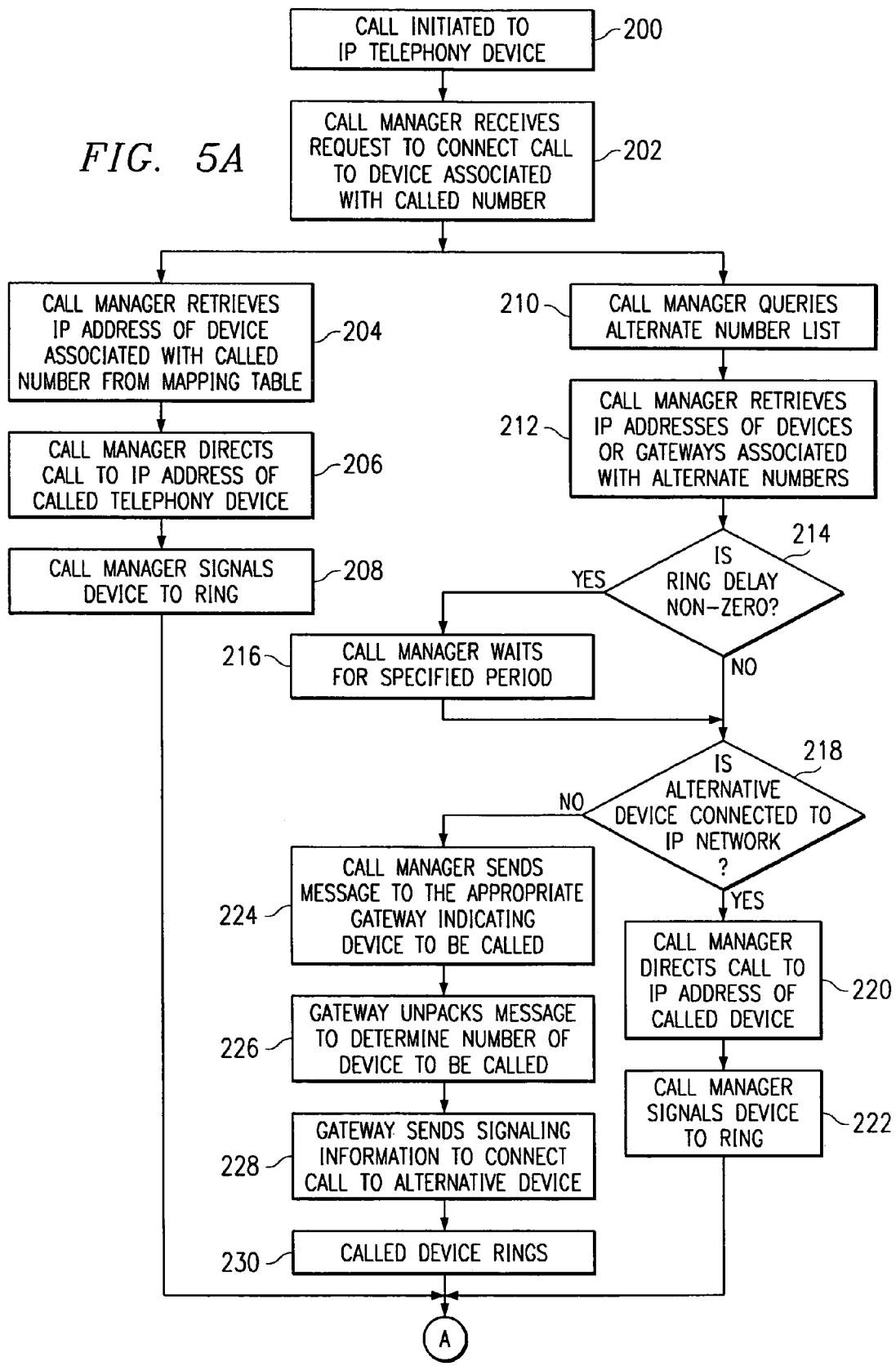
FIG. 5A illustrates a first portion of an exemplary method of generating multiple line appearance in the communication network in accordance with the present invention.
Figure 5B:
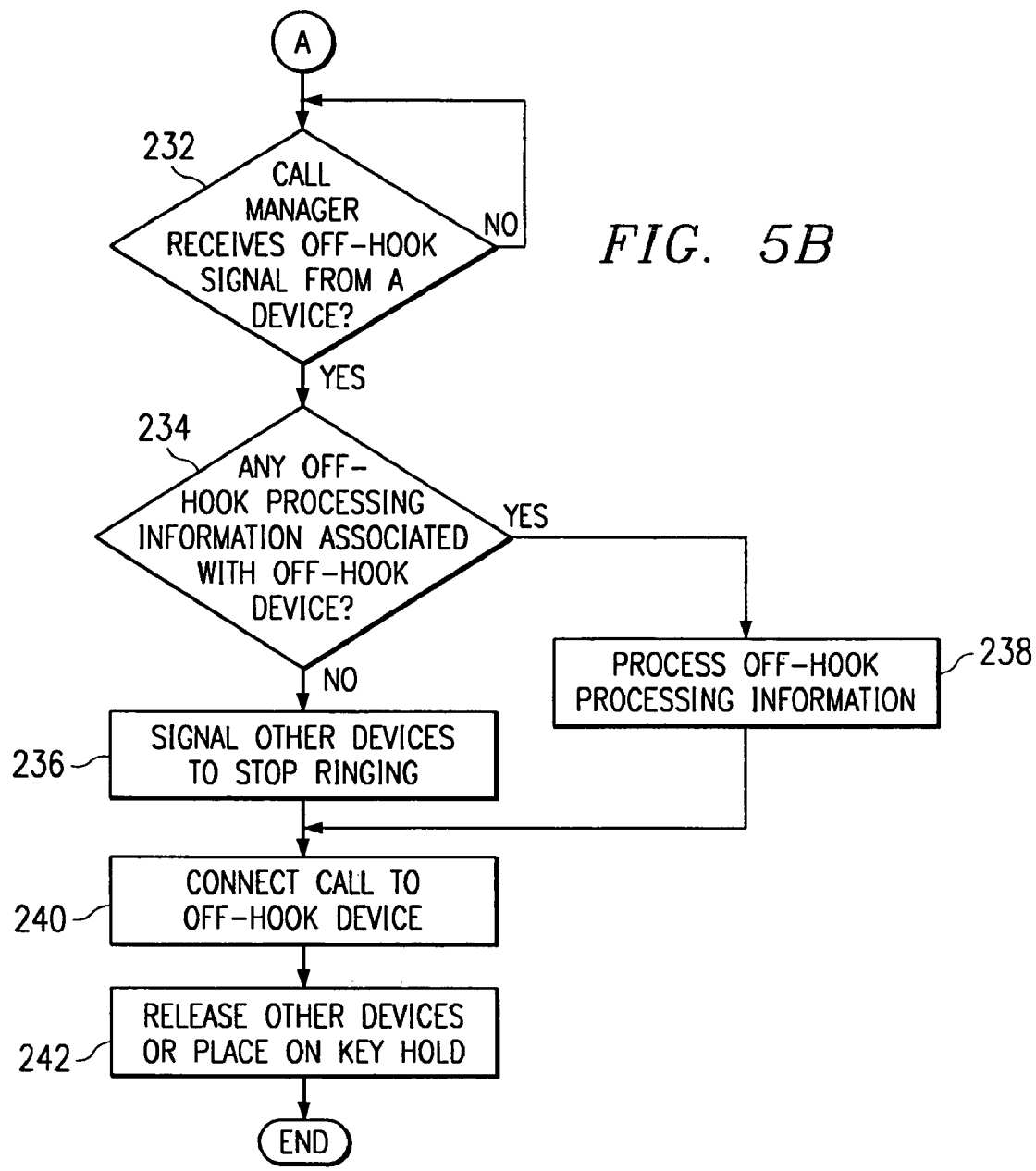
FIG. 5B illustrates a second portion of an exemplary method of generating multiple line appearance in the communication network in accordance with the present invention.

FIGS. 5A and 5B illustrate an exemplary method of generating multiple line appearances in communication network 10 in response to a call placed to a target IP telephony device. The process begins when an originating telephony device initiates a call to a target IP telephony device at step 200. The call is initiated through a call initiation request indicating the IP telephony device to which the call is directed. If the originating telephony device is an IP telephony device, then the originating IP telephony device typically generates the call initiation request. If the originating telephony device is a non-IP telephony device, then the call initiation request may be generated by the gateway 52, 64 that couples the originating telephony device to the target telephony device. The call initiation request is sent to the call manager 26 controlling the target IP telephony device, and call manager 26 receives the call initiation request at step 202.

Call manager 26 determines the telephone number of the target telephony device from the call initiation request and determines an associated IP address 124 of the target telephony device using mapping tables 120*a* and 120*b* at step 204. Call manager 26 directs the call to the target telephony device by signaling the target telephony device to indicate the presence of the incoming call at step 206. If the target telephony device accepts the call, call manager 26 signals the target telephony device to ring at step 208.

Furthermore, call manager 26 identifies and rings alternate telephony devices as follows. Once call manager 26 receives a call initiation request at step 202, it retrieves alternate number list 110 for the target telephony device. As described above, alternate number list 110 contains the numbers of telephony devices that are to be rung in addition to the associated target telephony device. Call manager 26 queries list 110 and determines the numbers 112 of the alternate telephony devices, as well as ring delay period 114 associated with each alternate telephony device, at step 210. For each alternate number 112, call manager 26 determines an associated IP address 124 from mapping tables 120*a* and 120*b* at step 212. As described above, if the alternate telephony device is an IP telephony device, then the associated IP address 124 is the actual IP address of the telephony device. If the alternate telephony device is a non-IP telephony device, then IP address 124 is the address of the gateway associated with the alternate telephony device.

Call manager 26 determines the length of ring delay period 114 for each alternate telephony device at step 214. If period 114 is non-zero, call manager 26 waits the length of that period at step 216. Although there may be more than one alternate telephony device, call manager 26 may begin the wait period for each alternate telephony device at the same time. Therefore, two or more alternate telephony devices may be "synchronized" to ring at approximately the same time by making ring delay period 114 the same for each telephony device. Furthermore, one or more alternate telephony devices may be "synchronized" to ring with the target telephony device by setting ring delay period 114 for these telephony devices to zero. Alternatively, call manager 26 may not have simultaneous processes occurring for each alternate device that allow it to begin the wait period for each device at exactly the same instant. Instead, call manager 26 may sequentially process the information in list 110 associated with each device. However, due to available processor speeds, this sequential processing may appear to occur simultaneously to the user.

After call manager 26 has waited delay period 114 for a particular alternate telephony device (if delay period 114 is non-zero), call manager 26 determines whether the telephony device is connected to an IP network (e.g., LAN 20, WAN 30, or Internet 40) at step 218. If the alternate telephony device is connected to an IP network, then call manager 26 directs the call to the IP address of the alternate telephony device at step 220. As with the target telephony device, call manager 26 directs the call to the alternate telephony device by signaling the telephony device to indicate the presence of an incoming call at step 220. If the alternate telephony device accepts the call, call manager 26 signals the alternate telephony device to ring at step 222.

If call manager 26 determines at step 218 that the alternate telephony device is not connected to the IP network using a flag or other indication, call manager 26 signals gateway 52, 64 to which the alternate telephony device is coupled to indicate that the alternate telephony device is to be called at step 224. Gateway 52, 64 receives the message (in the form of IP packets) from call manager 26 and retrieves the message to determine the telephone number (e.g., the NANP number or the PBX extension) of the alternate telephony device to be called at step 226. Gateway 52, 64 sends signaling information to connect the call to the alternate telephony device at step 228. This signaling information typically comprises dialing the telephone number of the alternate telephony device over a CO trunk or PBX line. If the alternate telephony device is available, the telephony device rings at step 230.

Since the target telephony device and the alternate telephony devices are rung simultaneously (with the exception of any ring delay period 114 for particular alternate devices), steps 208, 222, and 230 may occur at approximately the same time. Therefore, if ring delay period 114 for all alternate telephony devices is zero, these telephony devices will ring concurrently with the target telephony device, taking into account any associated processing and/or transmission delays in communication network 10. As described above, ring delay period 114 for certain alternate devices (e.g., automatic answering devices) can be set to a non-zero value to allow the other alternate devices to be answered before the automatic answering device goes off-hook.

Call manager 26 is operable to determine when an IP telephony device is taken off-hook (typically due to a signal sent by the IP telephony device to the call manager). If a non-IP telephony device is taken off-hook, the gateway 52, 64 associated with that telephony device is operable to determine when the telephony device goes off-hook, and gateway 52, 64 signals call manager 26 when this occurs.

Referring to FIG. 5B, call manager 26 waits for either the target telephony device or an alternate telephony device to be taken off-hook at step 232. As mentioned above, alternate number list 110 may include off-hook processing information associated with the target telephony device or one or more of the alternate telephony device. Once either the target telephony device or one of the alternate telephony devices is taken off-hook, call manager 26 determines whether there is any such off-hook processing information associated with the off-hook device at step 234. If there is none, the default is typically for call manager 26 to signal all of the other telephony devices to stop ringing at step 236. Alternatively, the off-hook processing information for the off-hook device may explicitly indicate that such an action be executed by call manager 26 at step 238. In either case, for IP telephony devices, call manager 26 sends a direct signal to the telephony device to instruct it to stop ringing. In order to instruct a non-IP telephony device to stop ringing, call manager 26 sends a signal to the associated gateway 52, 64, which then instructs the non-IP telephony device to stop ringing (e.g., by discontinuing the connection attempt with the non-IP telephony device).

Another example of off-hook processing information is an off-hook suppression flag associated with one or more alternate numbers. If the device that goes off-hook has an off-hook suppression flag, call manager 26 will allow the other devices to continue ringing at step 238, instead of signaling all devices to stop ringing as described above. Such an option may be useful when the device that goes off-hook is a pager, an answering machine, or any other type of automatic answering device. By allowing the other telephony devices to continue ringing, a user is given additional time to connect with the caller on another device. If a user takes another device off-hook, then call manager 26 may be operable to disconnect the call with the automatic answering device and connect the call to the user that has answered the call.

To complete the call, call manager 26 connects the answering (off-hook) telephony device to the originating telephony device at step 240. It should be noted that this connection may be made through one or more gateways 52, 64, depending on the location of the originating and answering telephony devices. Once the call is connected between the originating telephony device and the off-hook telephony device, call manager 26 may then release the other telephony devices or place them on key hold at step 242, among other options. If the other telephony devices are released, they can be used to place other calls (they will typically have a dial tone or its equivalent). If the other telephony devices are placed on key hold, they cannot be used until the call between the originating telephony device and the off-hook telephony device is completed. However, any telephony devices on key hold may have the option of connecting with the ongoing call by being taken off-hook during the call.

One advantage associated with the use of IP telephony devices is the ability to connect with the devices using a World Wide Web interface, such as a Web browser, on a computer. This capability allows a user of a particular telephony device (or a system administrator) to remotely access and edit the alternate number list 110 associated with a particular telephony device. A user may remotely access alternate number list 110 from a computer located on the same LAN 20 as the telephony device, or from a computer located across WAN 30. In addition, if the user's IP telephony device is coupled to Internet 40, then the user is also able to remotely access and edit the telephony device's alternate number list 110 from an Internet computer 42 located almost anywhere in the world.

It should be understood that although the concept of an alternate number list has been described in conjunction with an IP telephony device, the concept applies equally to calls made to non-IP devices, such as PBX or PSTN devices. In these cases the alternate number list may be maintained at locations such as the PBX or a central office instead of an IP call manager or an IP telephony device. In addition, the concept applies to other types of telephony devices that are capable of being coupled to and controlled from a traditionally computer-based network, such as a Frame Relay network. In these cases, as with an IP network, the alternate number list (and mapping tables, if appropriate) may be maintained on a network device such as a computer.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A communication system, comprising:
   a communication network;
   an originating telephony device coupled to the communication network;
   a target telephony device coupled to the communication network; and
   a call manager coupled to the communication network and operable to signal the target telephony device to indicate an incoming call from the originating telephony device, the call manager comprising:
   an alternate number list operable to identify at least one alternate telephony device to be signaled in response to the incoming call directed to the target telephony device, wherein the alternate telephony device is to be signaled while the target telephony device is signaled, and wherein the alternate number list comprises off-hook processing information associated with each alternate telephony device indicating actions to be taken by the call manager once the target telephony device or one or more of the alternate telephony devices have been taken off-hook to receive the incoming call; and
   one or more mapping tables associating a packet network address with each identified alternate telephony device.

2. The communication system of claim 1, wherein the communication network comprises:
   an Internet Protocol (IP) network;
   a non-IP network; and
   at least one gateway device coupling the IP network and the non-IP network.

3. The communication system of claim 2, wherein the IP network comprises an IP local area network (LAN).

4. The communication system of claim 2, wherein the IP network comprises a plurality of IP local area networks coupled using a wide area network (WAN).

5. The communication system of claim 2, wherein the non-IP network comprises the Public Switched Telephone Network (PSTN).

6. The communication system of claim 2, wherein the non-IP network comprises a private branch exchange (PBX) network.

7. The communication system of claim 2, wherein the alternate telephony device comprises an IP telephony device coupled to the IP network.

8. The communication system of claim 2, wherein the alternate telephony device comprises a non-IP telephony device coupled to the IP network using the gateway.

9. The communication system of claim 1, wherein the one or more mapping tables associate an IP address with each alternate telephony device.

10. The communication system of claim 1, further comprising a gateway operable to couple the alternate telephony device to the originating telephony device, wherein the packet network address associated with the alternate telephony device comprises a packet network address of the gateway.

11. The communication system of claim 1, further comprising a remote computer operable to modify the alternate number list.

12. A method of generating multiple line appearances in a communication network, comprising:
   receiving a call initiation request from an originating telephony device coupled to the communication network, the call initiation request directed to a target telephony device coupled to the communication network;
   determining a telephone number of at least one alternate telephony device from an alternate number list associated with the target telephony device;
   determining a packet network address associated with the alternate telephony device;
   signaling the target telephony device to indicate the call initiation request from the originating telephony device;
   signaling the alternate telephony device using the determined packet network address to indicate the call initiation request from the originating telephony device, wherein the alternate telephony device is signaled while the target telephony device is signaled;
   detecting an off-hook condition at one of the target telephony device and the alternate telephony device;
   determining whether to terminate the ringing on the target telephony device and the alternate telephony device in response to off-hook processing information associated with the target telephony device and the alternate telephony device, the off-hook processing information indicating actions to be taken once the target telephony device or one or more of the alternate telephony devices have been taken off-hook to receive an incoming call; and
   connecting the call between the originating telephony device and the telephony device having the off-hook condition.

13. The method of claim 12, further comprising:
   detecting an off-hook condition at one of the target telephony device and the alternate telephony device;
   terminating the ringing on the target telephony device and the alternate telephony device; and
   connecting the call between the originating telephony device and the telephony device having the off-hook condition.

14. The method of claim 12, wherein the communication network comprises an Internet Protocol (IP) network and the target device comprises an IP device.

15. The method of claim 14, wherein determining a packet network address associated with the alternate telephony device comprises determining an IP address of the alternate telephony device.

16. The method of claim 14, wherein determining a packet network address associated with the alternate telephony device comprises determining an IP address of a gateway device coupling the IP network to a non-IP network servicing the alternate telephony device.

17. The method of claim 16, wherein the non-IP network comprises the Public Switched Telephone Network (PSTN).

18. The method of claim 16, wherein the non-IP network comprises a private branch exchange (PBX) network.

19. The method of claim 16, wherein signaling the alternate telephony device comprises signaling the gateway device to dial a telephone number of the alternate telephony device.

20. The method of claim 12, further comprising programming the alternate number list associated with the target telephony device using a World Wide Web browser on a remote computer.

21. A call manager for controlling at least one telephony device coupled to a communication network, comprising:
   a network interface operable to couple the call manager to the communication network;

a memory operable to:
- store an alternate number list associated with a telephony device coupled to the communication network, the alternate number list identifying at least one alternate telephony device, wherein the alternate number list comprises off-hook processing information associated with each alternate telephony device indicating actions to be taken by the call manager once the target telephony device or one or more of the alternate telephony devices have been taken off-hook to receive the incoming call; and
- store one or more mapping tables associating a packet network address with each alternate telephony device; and a processor coupled to the memory and operable to receive a call initiation request identifying a telephony device, to access the alternate number list associated with the telephony device, and to signal the telephony device and at least one alternate telephony device identified in the alternate number list, wherein the alternate telephony device is signaled while the target telephony device is signaled.

22. The call manager of claim 21, wherein the packet network address comprises an Internet Protocol (IP) address of the alternate telephony device.

23. The call manager of claim 21, wherein the packet network address comprises an Internet Protocol (IP) address of a gateway device coupling the alternate telephony device to the call manager.

24. Call manager software embodied in a computer-readable medium and operable to perform the following steps:
- receiving a call initiation request from an originating telephony device coupled to a communication network, the call initiation request directed to a target telephony device coupled to the communication network;
- determining a telephone number of at least one alternate telephony device from an alternate number list associated with the target telephony device;
- determining a packet network address associated with the alternate telephony device;
- signaling the target telephony device to indicate the call initiation request from the originating telephony device;
- signaling the alternate telephony device using the determined packet network address to indicate the call initiation request from the originating telephony device, wherein the alternate telephony device is signaled while the target telephony device is signaled;
- detecting an off-hook condition at one of the target telephony device and the alternate telephony device;
- determining whether to terminate the ringing on the target telephony device and the alternate telephony device in response to off-hook processing information associated with the target telephony device and the alternate telephony device, the off-hook processing information indicating actions to be taken once the target telephony device or one or more of the alternate telephony devices have been taken off-hook to receive an incoming call; and
- connecting the call between the originating telephony device and the telephony device having the off-hook condition.

25. The call manager software of claim 24, further operable to perform the following steps:
- detecting an off-hook condition at one of the target telephony device and the alternate telephony device;
- terminating the ringing on the target telephony device and the alternate telephony device; and
- connecting the call between the originating telephony device and the telephony device having the off-hook condition.

26. The call manager software of claim 24, wherein the communication network comprises an Internet Protocol (IP) network and the target device comprises an IP device.

27. The call manager software of claim 26, wherein determining a packet network address associated with the alternate telephony device comprises determining an IP address of the alternate telephony device.

28. The call manager software of claim 26, wherein determining a packet network address associated with the alternate telephony device comprises determining an IP address of a gateway device coupling the IP network to a non-IP network servicing the alternate telephony device.

29. The call manager software of claim 28, wherein the non-IP network comprises the Public Switched Telephone Network (PSTN).

30. The call manager software of claim 28, wherein the non-IP network comprises a private branch exchange (PBX) network.

31. The call manager software of claim 28, wherein signaling the alternate telephony device comprises signaling the gateway device to dial a telephone number of the alternate telephony device.

* * * * *